United States Patent

Cheng et al.

Patent Number: 6,122,225
Date of Patent: Sep. 19, 2000

[54] HYDROPHONE WITH COMPENSATION FOR STATICAL PRESSURE AND METHOD FOR PRESSURE WAVE MEASUREMENT

[76] Inventors: Lun Kai Cheng, Treviso 56, NL-2921 BJ Krimpen aan de Ijssel; Dick Bruijn, Oostblok 34, NL-2612 PC Delf, both of Netherlands

[21] Appl. No.: 09/319,576
[22] PCT Filed: Dec. 9, 1997
[86] PCT No.: PCT/NL97/00680
§ 371 Date: Jul. 30, 1999
§ 102(e) Date: Jul. 30, 1999
[87] PCT Pub. No.: WO98/26259
PCT Pub. Date: Jun. 18, 1998

[30] Foreign Application Priority Data
Dec. 9, 1996 [NL] Netherlands ............................ 1004731

[51] Int. Cl.[7] .............................. H04R 1/44; H04R 23/00; G01H 9/00
[52] U.S. Cl. ............................................ 367/149; 367/172
[58] Field of Search ..................................... 367/140, 149, 367/141, 173, 172; 356/345; 250/227.14, 227.19, 227.27

[56] References Cited

U.S. PATENT DOCUMENTS

| | | |
|---|---|---|
| 4,518,857 | 5/1985 | McMahon et al. . |
| 4,530,078 | 7/1985 | Lagakos et al. . |
| 4,570,248 | 2/1986 | Assard ....................................... 367/149 |
| 5,317,929 | 6/1994 | Brown et al. . |
| 5,363,342 | 11/1994 | Layton et al. ........................... 367/149 |
| 5,394,377 | 2/1995 | Von Bieren . |

FOREIGN PATENT DOCUMENTS

| | | |
|---|---|---|
| 0554085 A2 | 1/1993 | European Pat. Off. . |
| 31 43 824 A1 | 1/1983 | Germany . |

*Primary Examiner*—Ian J. Lobo
*Attorney, Agent, or Firm*—Needle & Rosenberg, P.C.

[57] ABSTRACT

Device (20) for measuring pressure waves in a liquid medium (E), comprising; one or more sensor elements (23) permeable to optical radiation; one or more support members (22) on which a sensor element (23) is arranged in each case and which is at least slightly flexible; a chamber (25) at least partly enclosed by a support member (22) and filled with the liquid medium; and a second compensation chamber (27) which is actively coupled to the first compensation chamber via an at least partially flexible wall (26), wherein the second compensation chamber is filled with gas; and detection means for detecting changes in the length of the sensor element.

16 Claims, 7 Drawing Sheets

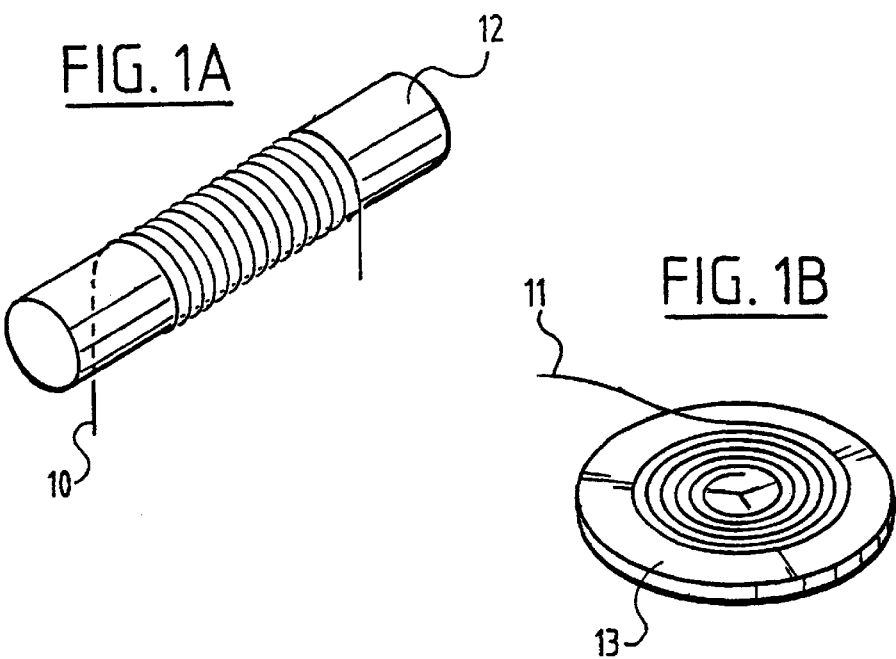
FIG. 1A
FIG. 1B
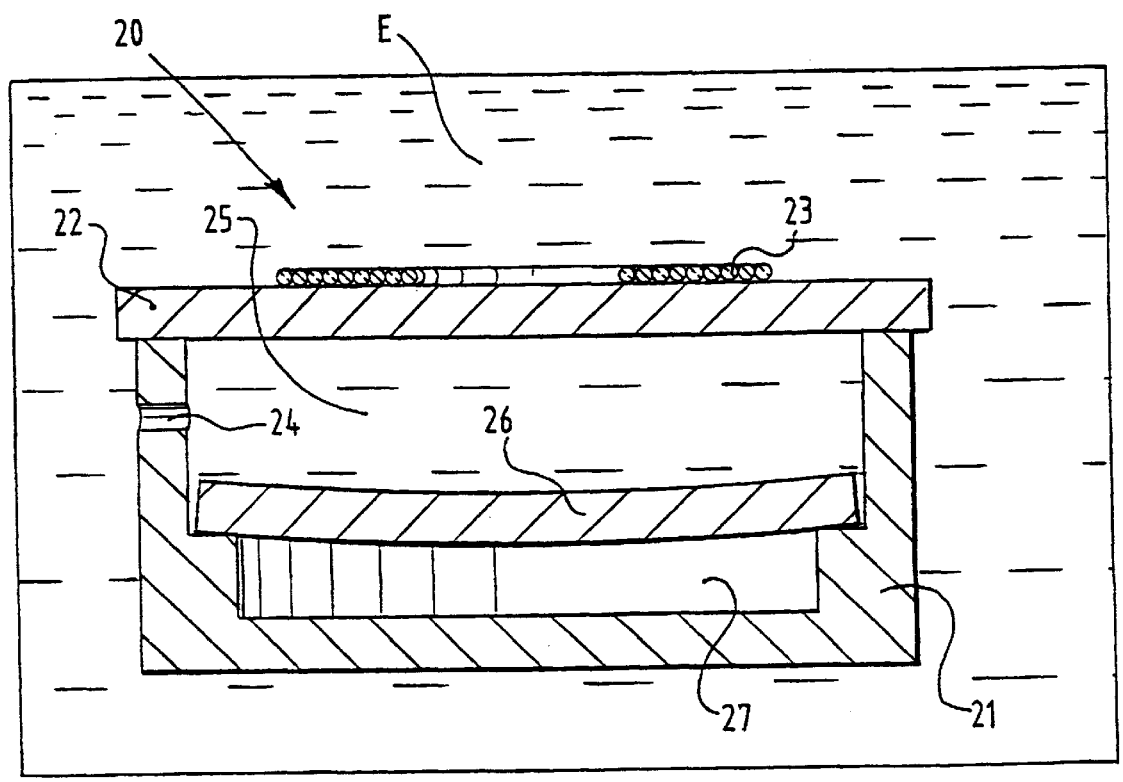
FIG. 2

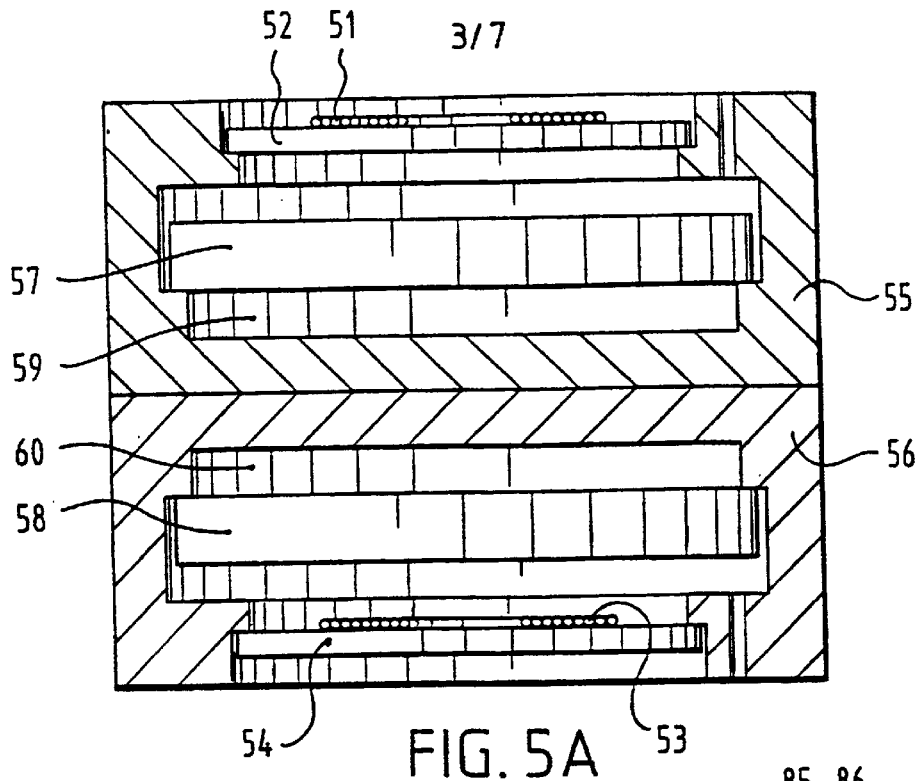
FIG. 5A
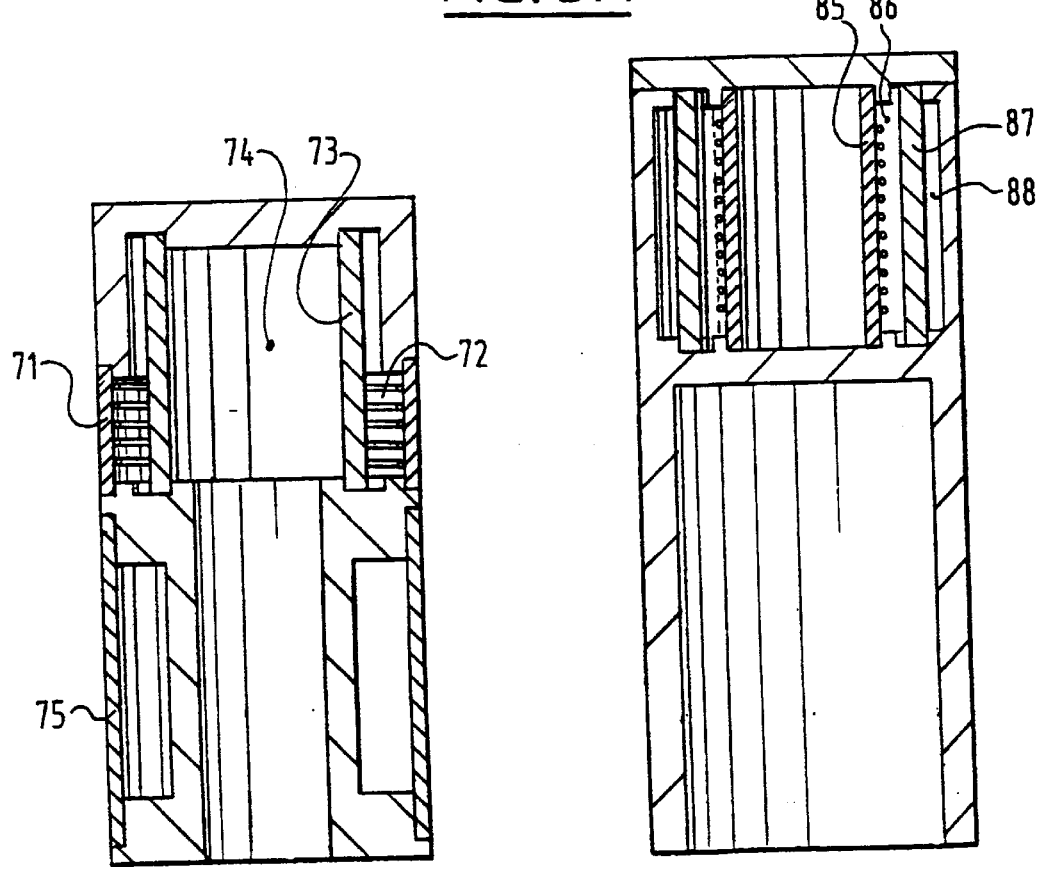
FIG. 5B
FIG. 5C

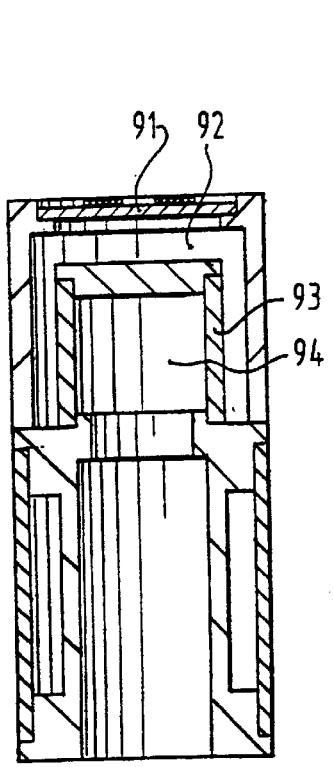 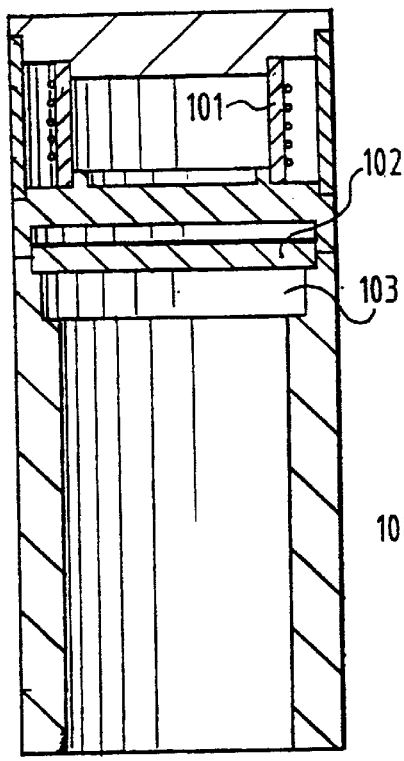 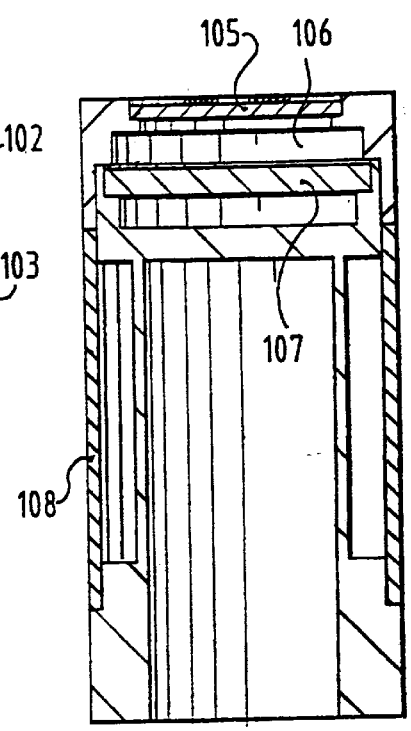
FIG. 5D  FIG. 5E  FIG. 5F
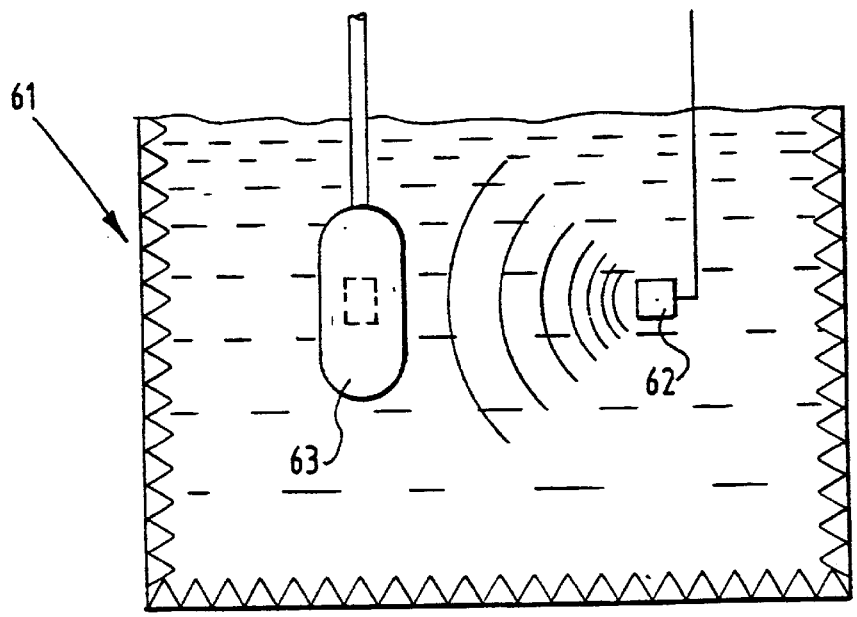
FIG. 6

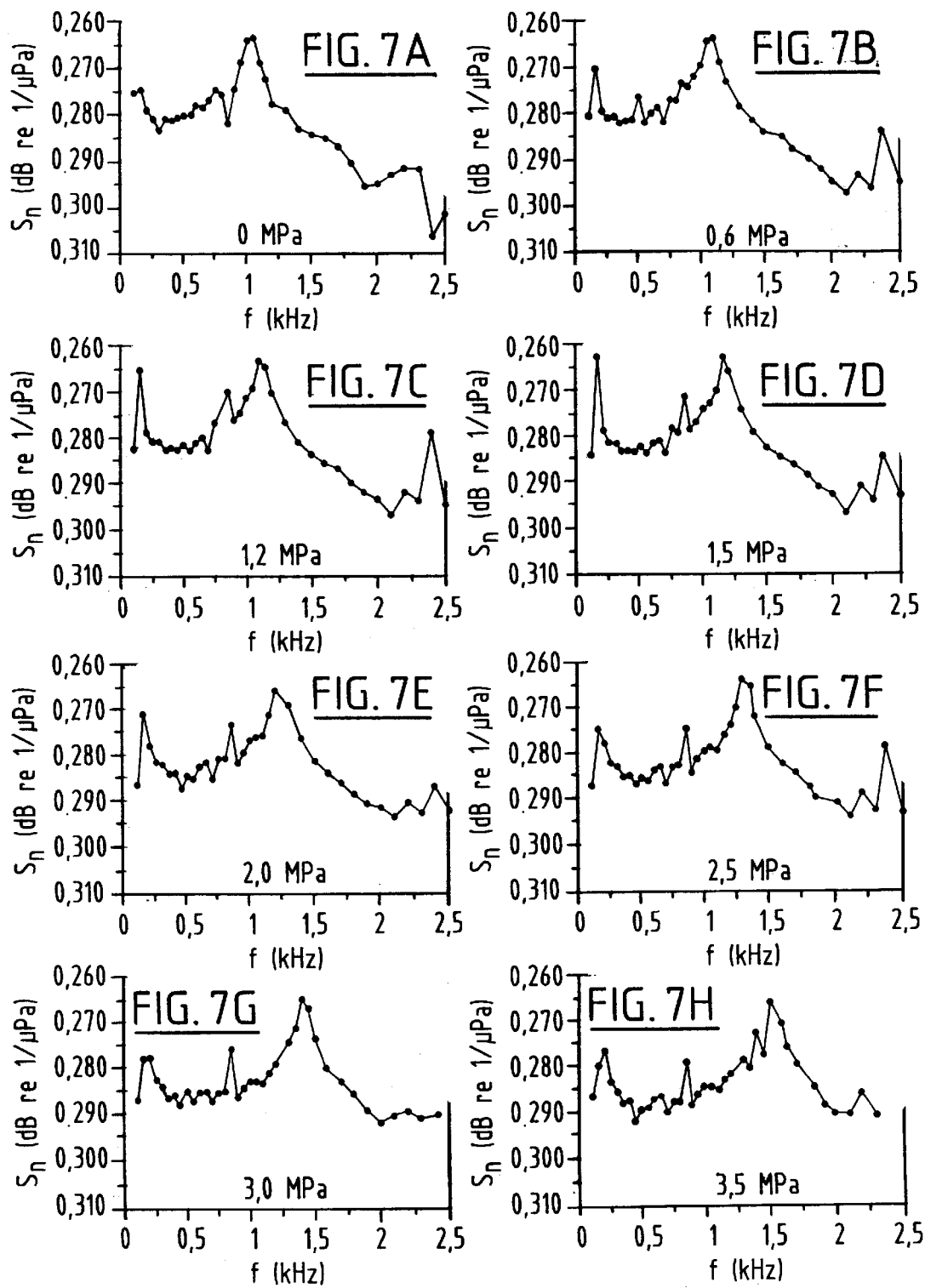

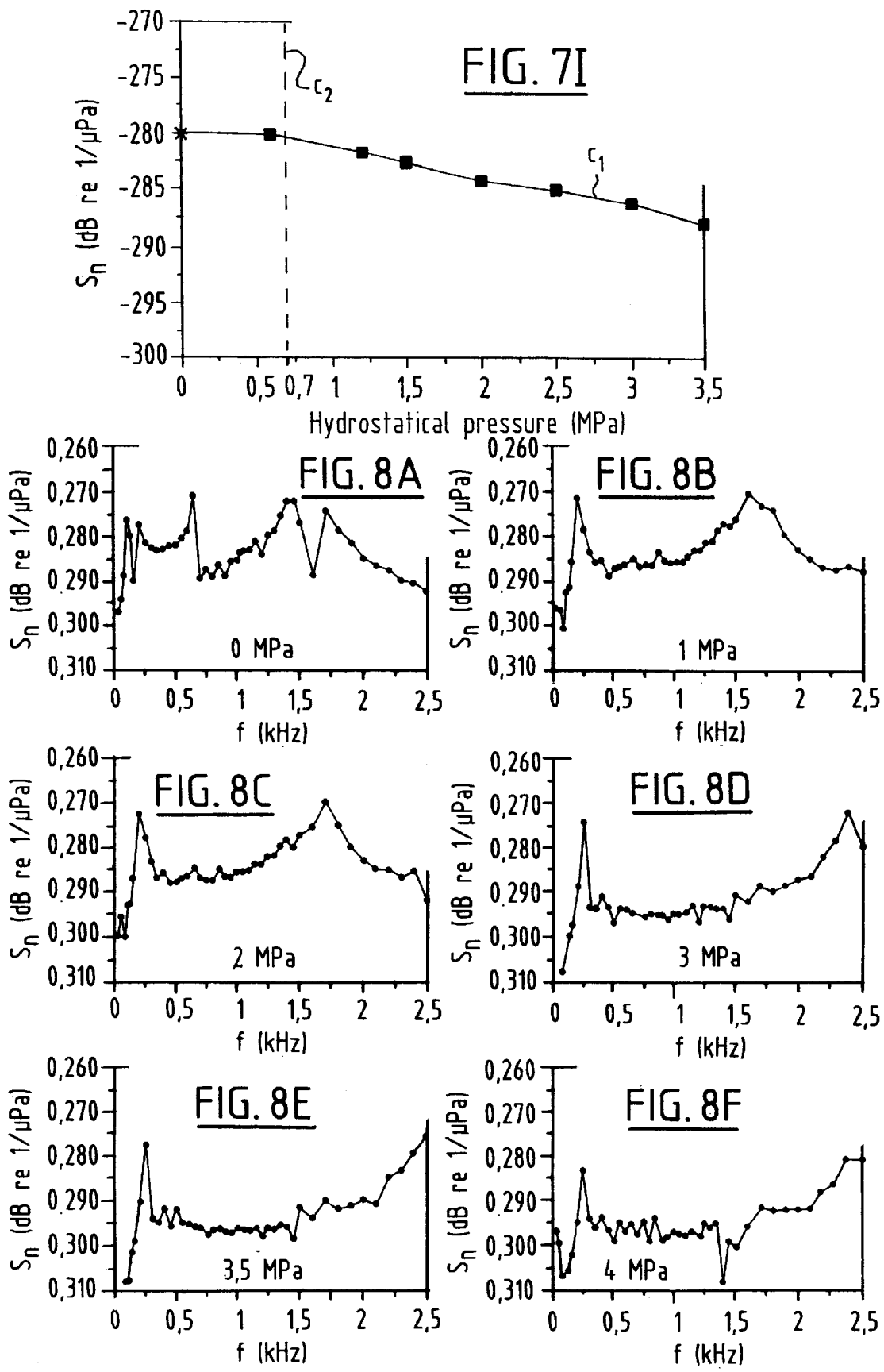

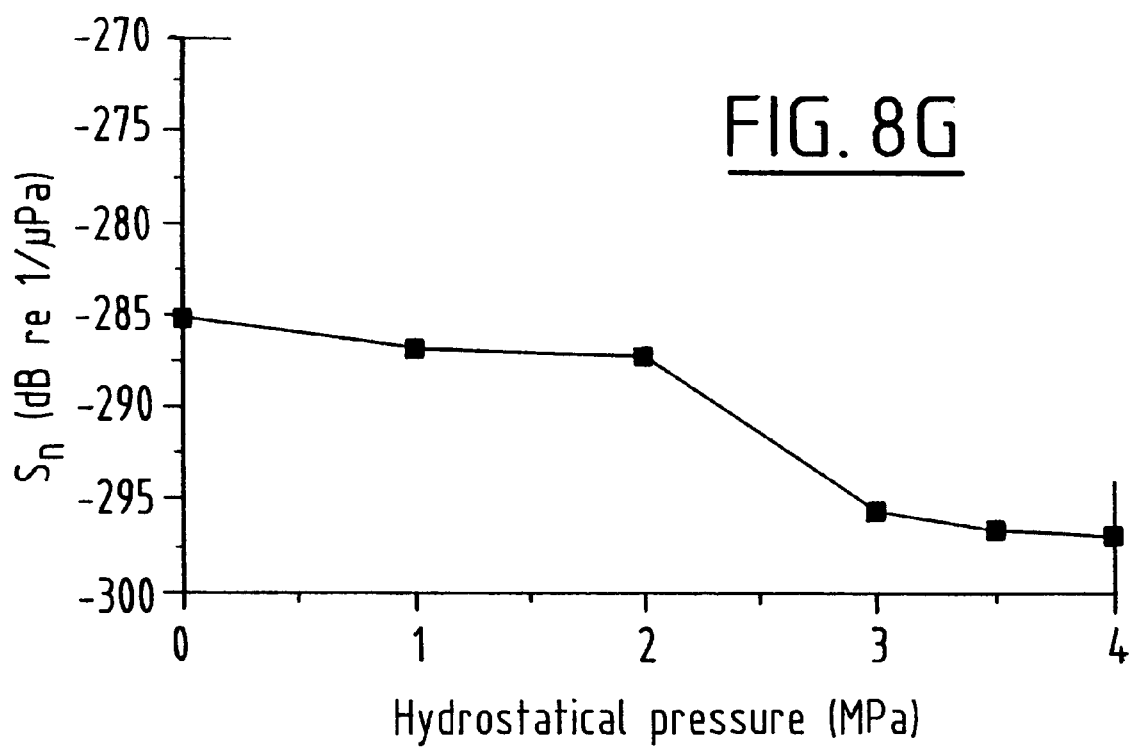

HYDROPHONE WITH COMPENSATION FOR STATICAL PRESSURE AND METHOD FOR PRESSURE WAVE MEASUREMENT

FIELD OF THE INVENTION

The present invention relates to hydrophones are used to determine ship movements on or in the sea using acoustic measurements to include measured reflections of acoustic waves brought about by explosions for seismic measurements.

BACKGROUND

Efforts are being made worldwide to develop a hydrophone having a high sensitivity which is influenced little (or not at all) by static pressure, i.e. the depth of the water in which the measurements are performed.

A hydrophone wherein use is made of an optical fibre is for instance known from the U.S. Pat. No. 5,247,490 and in European patent application No. 0,554,085.

In practice a glass fibre is arranged on a mandrel-like or disc-shaped support member, wherein pressure variations are measured by the deformation of the support member relative to a reference sensor element which undergoes no mechanical deformation, and wherein the change in length is measured by means of interference between light-beams transmitted through the fibres.

In order to compensate for the static pressure it is for instance known from the European patent application No. 0,554,085 to arrange a compensation chamber beneath a flexible disc-shaped membrane on which the optical sensor is arranged, which compensation chamber is then in open communication via an aperture of predetermined dimensions with the liquid medium in which measurement is taking place. The size of the aperture determines the dynamic behaviour of such sensors.

Such a sensor displays a drastic reduction in sensitivity relative to a sensor with a closed (air) chamber. Increasing the dimensions of the sensor, for instance by a factor of 10 to 20, in order to limit this reduction meets with practical drawbacks during use. In order to obtain sufficient resolution (i.e. the number of measurement points) the smallest possible dimensions are desirable.

The '377 patent discloses a hydrophone wherein a first chamber with a sensor fibre is filled with air and enclosed by water, and a second double-walled cylinder a with reference fibre is filled with air or a gas and enclosed by water. Under hydrostatic pressure both cylinders are deformed and the respective length of each of the fibres is thus changed.

SUMMARY OF THE INVENTION

The present invention has for its object to improve the known hydrophones and more particularly to provide a hydrophone with compensation for static pressure while retaining sufficient sensitivity.

The present invention provides a device for measuring pressure waves in a liquid medium having:

one or more sensor elements permeable to optical radiation;

one or more support members on which a sensor element is arranged in each case and which is at least slightly flexible;

a compensation chamber at least partly enclosed by a support member and filled with a liquid medium;

a second compensation chamber which is actively coupled to the first compensation chamber via an at least partially flexible wall, wherein the second compensation chamber is filled with gas; and a detection device for detecting changes in the length of the sensor element.

According to the present invention the first compensation chamber filled with water is used to build up hydrostatic pressure. The volume herein changes of both the first compensation chamber and the second compensation chamber filled with air, with the result that the disc with the sensor fibre remains flat and there occurs no change in the length thereof. In the case of acoustic pressure the disc with the sensor fibre is bent and the length thereof changes. The deformation of the disc is made possible by volume changes in the second compensation chamber. The disc with the sensor fibre therefore remains flat in the case of hydrostatic pressure, in contrast to the bending when acoustic pressure occurs.

Further advantages, features and details of the present invention will be elucidated on the basis of the following description with reference to the annexed drawings, in which:

BRIEF DESCRIPTION OF THE DRAWINGS

FIGS. 1A and 1B respectively show views of two known support members with optical sensor elements;

FIG. 2 shows a view in section of a first preferred embodiment of a device according to the present invention;

FIGS. 5A–F show further preferred embodiments of devices according to the present invention;

FIG. 6 is schematic view of a measurement arrangement wherein measuring is performed on the preferred embodiments according to the present invention;

FIGS. 7A–7I show graphs of results of measurements on the device according to FIG. 3 of normalized sensitivity $S_n$ as a function of the frequency f at pressures of 0; 0.6; 1.2; 1.5; 2.0; 2.5; 3.0 respectively 3.5 MPa (FIGS. 7A–7H), wherein FIG. 7I gives the normalized sensitivity averaged over the frequency as a function of the hydrostatic pressure; and FIGS. 8A–8G show graphs of results of measurements on the device according to FIG. 5 of normalized sensitivity $S_n$ as a function of the frequency f at pressures of 0; 1; 2; 3; 3.5 respectively 4.0 MPa (FIGS. 8A–8F), wherein FIG. 8G indicates the normalized sensitivity averaged over the frequency as a function of the hydrostatic pressure.

DETAILED DESCRIPTION OF THE PREFERRED EMBODIMENTS

Figure 3:
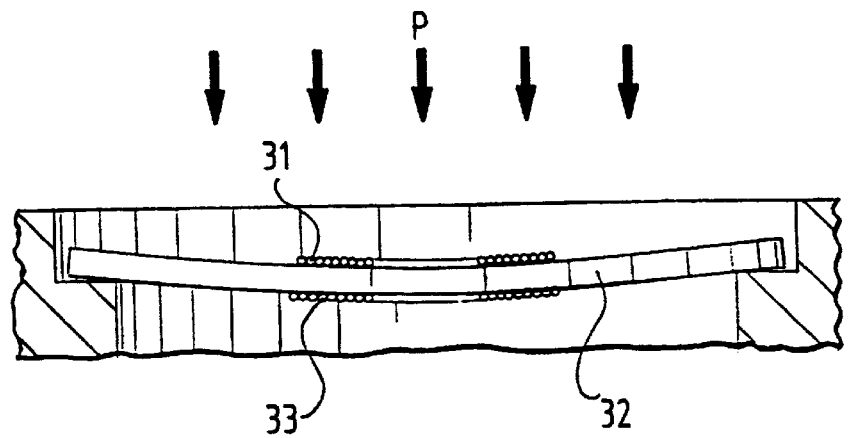
FIG. 3 shows a view in section of an alternative embodiment of a device according to the present invention.

Referring now to the drawings, although other forms can be envisaged, such as a sleeve, most known bodies on which an optical fibre 10, 11 (FIGS. 1A, 1B) is integrated or otherwise arranged are a cylindrical rod-or mandrel 12 or a disc 13. When the body with optical fibre thereon or therein is exposed to acoustic waves, the length of the optical fibre changes to an extent which depends inter alia on the material of the body. As will be further explained below, this change in length can be measured using a laser and an interferometer.

The first embodiment of a hydrophone 20 (FIG. 2) contains a substantially cylindrical housing 21, on the top of which is arranged a disc 22 on which an optical fibre 23 is integrated or otherwise mounted. Further arranged in housing 21 is an aperture 24 which connects a first compensation chamber 25 to the environment E which is situated at a certain depth under water. Opposite the disc 22 the chamber 25 is bounded by a second disc 26 which defines a space 27 in which is arranged a gaseous medium, for instance air. This second compensation chamber enables a higher sensitivity, even at determined values of the static pressure. The dynamic behaviour is influenced by the diameter of the hole 24, for instance with a dimension of 0.1–5.5 mm.

The material of the disc can be chosen from a variety of materials, such as aluminium, PPO (polyphenylene oxide) (Noryl), polymethyl methacrylate (PMMA), polypropylene and PVDF (polyvinylidene fluoride) as well as polycarbonate. A choice is made in the present invention for polycarbonate of the tradename LEXAN because of its ready availability and specifications, particularly with regard to the ratio of the tensile strength T of the material and the Young's modulus E thereof.

In the embodiment shown in FIG. 3 a first optical fibre 31 is arranged in spiral form on the top side of a disc 32, while a second spiral-shaped fibre 33 is arranged on the underside i.e. on the side of the compensation chamber filled with water (see also FIG. 2), whereby a bending of disc 32 in the direction shown in FIG. 3 brought about by a pressure P causes a contraction of fibre 31 and an expansion of fibre 33. The sensitivity of the sensor shown in FIG. 3 (and FIG. 4) is therefore approximately twice as great as that of FIG. 2.

Figure 4:
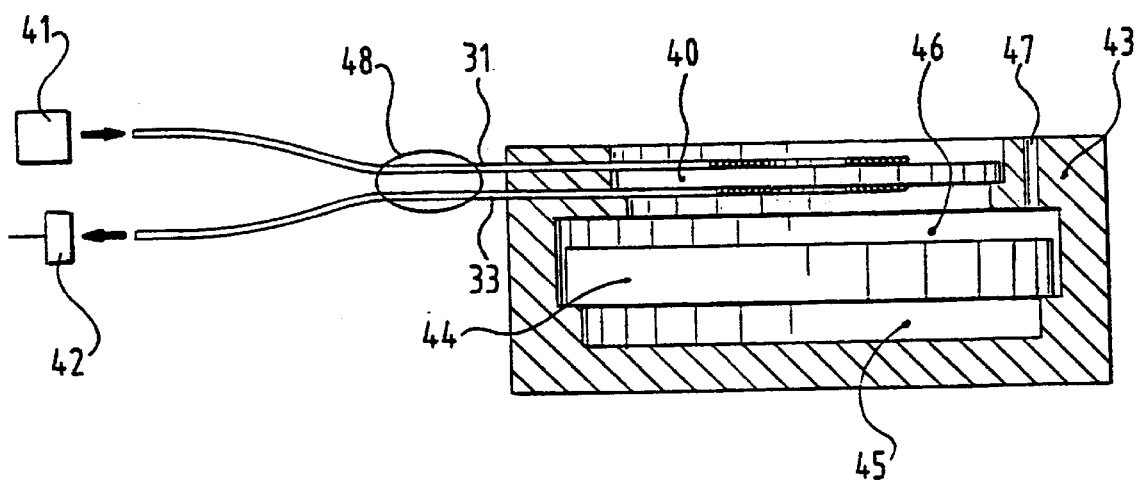
FIG. 4 shows a schematic view of an arrangement wherein the embodiment shown in FIG. 3 is used.

The difference in length can be measured using an interferometer, such as shown schematically For instance in the embodiment of FIG. 4, wherein a laser beam is transmitted from a laser 41 via a glass fibre beam-splitter 48 into each of the fibres 31 and 33 and the difference in path length of the laser light is deduced in a detector 42. Further shown in FIG. 4 is a housing 43 with a compensation disc 44, an air chamber 45 and a first compensation chamber 46 which communicates with the environment via a hole 47.

FIG. 5A shows a further embodiment of a device according to the present invention, wherein a first fibre 51 is arranged on the top side of a support body 52, while a second fibre 53 is arranged on the top side of a disc 54. In a communal-housing, which can equally consist of two mutually fixed parts 55, 56, are further arranged compensation discs 57, 58 which define air chambers 59 respectively 60. The arrangement shown in FIG. 5A is less sensitive to axial accelerations.

In the embodiment shown in FIG. 5B the optical fibre is arranged for instance on a cylindrical wall 71, while compensation chamber 72 is bounded on the other side by a cylindrical wall 73 which encloses a chamber 74 filled with air. Chamber 72 is in indirect contact with the hydrostatic pressure via a cylindrical wall 75.

In the embodiment according to FIG. 5C the optical fibre is situated for instance on a cylindrical wall 85, while compensation chamber 86 is bounded on the other side by a cylindrical wall 87, behind which is situated the compensation chamber 88 filled with gas.

In the embodiment shown in FIG. 5D the optical fibre is situated for instance on a disc 91, while a first compensation chamber 92 is first bounded by a cylindrical wall 93 which on the other side encloses a compensation chamber 94.

In the embodiment of FIG. 5E the optical fibre is situated on a cylindrical wall 101, while a compensation chamber 103 filled with gas in the figure is closed on the one side by a compensation disc 102, while the closure on the underside is not shown.

Finally, in the embodiment shown in FIG. 5F the optical fibre is arranged on a disc 105, while a first compensation chamber 106 is bounded by a compensation disc 107 and the space 106 is in indirect communication with the hydrostatic outside pressure via the flexible cylindrical wall 108.

A model for the discs (on which optical fibres may or may not be arranged), is described by D. A. Brown et al. in the paper "Fiber Optic Flexural Disk Microphone", Proceedings of SPIE, Vol. 985, pp. 172, 1988, and in the paper "High-Sensitivity, Fiber Optic, Flexural Disk Hydrophone Reduced Acceleration Response", Fiber and Integrated with Optics, Vol. 8, pp. 169, 1989.

For the normalized sensitivity the following formula applies $$S_{n,ss} = 0.78\frac{\Delta L}{Lp} = 0.78\frac{3(1-\sigma)(3+\sigma)}{8Et^2}\left[a^2 - \frac{1+\sigma}{2(3+\sigma)}(c^2+b^2)\right]$$

wherein $S_{n,ss}$ is the normalized sensitivity, 0.78 is a factor resulting from the photoelastic effect of tension in the fibre, $$\frac{\Delta L}{Lp}$$

is the relative change in length of the fibre under the influence of the pressure p, $\sigma$ is Poisson's constant, E is Young's modulus, a is the radius of the disc, t is the thickness and b and c is the inner respectively outer radius of the spirally wound fibre which determines the length of the fibre subjected to pressure variations.

For the resonance frequency $f_{ss}$ can be derived $$f_{ss} = 0.229\frac{t}{a^2}\sqrt{\frac{E}{\rho(1-\sigma^2)}}$$

while for the pressure tolerance $P_d$ of the disc can be derived $$P_{d,ss} = \frac{8T}{3(3+\sigma)}\frac{t^2}{a^2}$$

wherein $\rho$ is the specific mass of the disc, $S_n$ the normalized sensitivity and T the tensile strength of the material.

In the above formulae it is assumed that the mechanical properties of the disc are determined by the material thereof; no account is taken of the influence of the spirally wound glass fibre arranged thereon. Measured values can therefore differ to a greater or lesser extent from the above mentioned theoretical values.

In the above formulae is further assumed a disc which is not clamped on its peripheral edge. If the disc is clamped on its peripheral edge, the following formulae apply:

$$S_{n,cl} = 0.78\frac{\Delta L}{Lp}cl = 0.78\frac{3(1-\sigma^2)}{8Et^2}\left[a^2 - \frac{(c^2+b^2)}{2}\right]$$

$$f_{cl} = 0.47\frac{t}{a^2}\sqrt{\frac{E}{\rho(1-\sigma^2)}}$$

$$P_{d,cl} = \frac{4T}{3}\frac{t^2}{a^2}$$

wherein $$\frac{\Delta L}{L} cl$$

is the relative change in length of the fibre in the case of clamping and at pressure p.

In practice the disc will be neither completely free at its edge nor completely clamped.

Measurement were performed on hydrophones according to the present invention in a basin 61 (FIG. 6) in which a schematically designated sound source 62 was arranged and hydrophones according to the present invention as well as a reference hydrophone were placed in a pressure vessel 63.

With the arrangement shown in FIG. 6 the normalized sensitivity was measured for different pressures. For the normalized sensitivity $S_n$ applies:

$$S_n = 0.78 \frac{\epsilon}{p}$$

wherein the factor 0.78 derives from the photoelastic effect of the tension in the fibre, R is the applied pressure, and $\epsilon$ is the strain (i.e. the relative change in length) in the optical fibre. The unit of the normalized sensitivity is 1/Pa and is generally expressed as decibel in relation to $1/\mu Pa$ (dB re $1/\mu Pa$).

The absolute sensitivity $S_a$ is defined as the ratio of the phase change in the interferometer and the applied pressure. The unit of $S_a$ is rad/Pa. The following relation applies between the absolute and relative sensitivity:

$$S_a = \frac{Mn2\pi L_s}{\lambda} S_n$$

wherein
M=1 applies to the Mach-Zehnder interferometer and
M=2 to an interferometer of the Michelson type;
n is the index of refraction of the optical fibre (generally about equal to 1.5);
$L_s$ is the length of the fibre which is sensitive to the applied pressure; $\lambda$ is the wavelength of the laser source which is used in the interferometric system.

FIGS. 7A–7H show the measurement results of the normalized sensitivity $S_n$ for the arrangement shown in FIGS. 3 and 4 using a Michelson interferometer. A thickness t of 1 mm was chosen for disc 32 and a thickness of 3 mm for disc 44. For a pressure of 0 MPa was assumed a depth of 3 meters (actual pressure 0.03 MPa). For the disc 32 further applied that a is 15 mm, b is 8 mm and c is 12 mm, the material was LEXAN. The hole 47 had a diameter of 5.5 mm.

In FIG. 7I the curve $c_1$ designates the connection of the various measurement points of the average of the normalized sensitivity from the FIGS. 7A–H. By removing the liquid medium from the compensation chamber and closing the aperture to the environment, there resulted a sensor with closed air chamber. The normalized sensitivity at 0 MPa remained the same, as indicated in 7I by an *. At a static pressure of 0.7 MPa, as designated by broken line $c_2$ in FIG. 7I, the sensor was irreparably damaged.

Shown in FIGS. 8A–8F are the measurement results of the normalized pressure $S_n$ for the preferred embodiment shown in FIG. 5A. In this measurement use was made of the Mach-Zehnder interferometer. The diameter of the aperture 49 amounted to 5.5 mm and the dimensions of the disc-shaped supports were otherwise roughly equal to the above stated dimensions.

FIG. 8G shows a graph of the various measurement points of the FIGS. 8A–8F.

It has been found from the above experiments that the inclusion of an air-filled compensation chamber behind the compensation chamber filled with water obviates the drawbacks of the latter, i.e. reduction of the normalized sensitivity relative to a sensor with closed air chamber or much too large dimensions of the sensor.

The invention is not limited to the above described preferred embodiments, as it is understood by those skilled in the art that many modifications of the above-described embodiments of the invention are possible.

What is claimed is:

1. A device for measuring pressure waves in a liquid medium, comprising:
    at least one sensor element;
    at least one flexible support member having a first side and an opposed second side, said at least one sensor element being disposed on the first side of said at least one support member;
    a first compensation chamber at least partly enclosed by the second side of said at least a first support member and filled with the liquid medium;
    a flexible compensation member spaced from said first support member, said compensation member also at least partially enclosing said first compensation chamber;
    a second compensation chamber at least partially enclosed by said compensation member so that the second compensation chamber is actively coupled to the first compensation chamber by said compensation member said second compensation chamber being filled with a gas; and
    a detector adapted to detect changes in the length of the at least one sensor element.

2. The device of claim 1, further comprising an aperture defined in said first compensation chamber for allowing the liquid medium to enter the first compensation chamber at the ambient pressure thereof.

3. The device of claim 1, wherein said at least one sensor element comprises an optical fiber, said optical fiber being disposed on said at least one support member in a spiral shape.

4. The device of claim 3, wherein said first compensation chamber is substantially cylindrical.

5. The device of claim 1, said compensation member comprising a cylindrical disc-like plate positioned between the first compensation chamber and the second compensation chamber.

6. The device of claim 1, further comprising a second optical sensor element disposed on the second side of said at least one support member.

7. The device of claim 1, said at least one support member comprising a first support member having a first side and an opposite second side and a spaced second support member having a first side and an opposite second side, said at least one sensor element comprising a first sensor element disposed on a selected one of the sides of the first support member and a second sensor element is disposed on a selected one of the sides of the second support member.

8. The device of claim 1, wherein the support member is formed as a substantially disc shaped cylindrical plate.

9. The device of claim 1, wherein the at least one support member is substantially rod-like.

10. The device of claim 1, wherein said detector comprises an interferometer.

11. The device of claim 1, wherein a pressure prevailing in the first compensation chamber is substantially the same as the ambient pressure of the liquid medium.

12. The device of claim 1, wherein said second compensation chamber comprises a cylindrical chamber.

13. The device of claim 1, further comprising a second sensor element disposed on the second side of the at least one support member.

14. The device of claim 1, said compensation member having a first side and an opposed second side, the first side of said compensation member at least partially enclosing said first compensation chamber, and the second side of the compensation member at least partially enclosing said second compensation chamber.

15. A method of measuring pressure waves in a liquid medium using a hydrophone, said method comprising:

positioning at least one elongate sensor on a first side of at least one support member provided as a part of the hydrophone;

at least partially enclosing a first compensation chamber with an opposed second side of the at least one support member;

spacing a compensation member from said at least one support member and at least partially enclosing the first compensation chamber and a spaced second compensation chamber, respectively, with said compensation member; and detecting changes in the length of the at least one sensor element in response to the receipt by the hydrophone of pressure waves transmitted through the liquid medium.

16. The method of claim 15, further comprising the steps of:

filling the first compensation chamber with the liquid medium; and filling the second compensation chamber with a gas.

* * * * *